(12) United States Patent
Roos et al.

(10) Patent No.: US 8,189,278 B2
(45) Date of Patent: May 29, 2012

(54) OPTICAL SYSTEM

(75) Inventors: Sven-Olov Roos, Floda (SE); Daniel Bengtsson, Kållered (SE); Ola Blomster, Mölndal (SE)

(73) Assignee: Optoskand AB, Mölndal (SE)

( * ) Notice: Subject to any disclaimer, the term of this patent is extended or adjusted under 35 U.S.C. 154(b) by 156 days.

(21) Appl. No.: 12/664,505

(22) PCT Filed: Jun. 11, 2008

(86) PCT No.: PCT/SE2008/000386
§ 371 (c)(1),
(2), (4) Date: Dec. 14, 2009

(87) PCT Pub. No.: WO2008/153468
PCT Pub. Date: Dec. 18, 2008

(65) Prior Publication Data
US 2010/0254031 A1    Oct. 7, 2010

(30) Foreign Application Priority Data
Jun. 13, 2007  (SE) .................................... 0701437

(51) Int. Cl.
*G02B 7/02* (2006.01)
*G02F 1/01* (2006.01)
(52) U.S. Cl. .......... 359/820; 259/288; 259/358; 385/29; 385/100; 372/35; 372/6
(58) Field of Classification Search .................. 359/820; 372/6, 34, 50.1, 70; 374/32, 73.1; 385/14, 385/29, 33, 39, 48, 70, 80, 100, 123–126, 385/134, 139; 29/25.01, 428; 165/60
See application file for complete search history.

(56) References Cited

U.S. PATENT DOCUMENTS

| | | | | |
|---|---|---|---|---|
| 3,501,714 A * | 3/1970 | Myers et al. | ..................... | 372/35 |
| 5,290,280 A * | 3/1994 | Daikuzono | ..................... | 606/16 |
| 5,778,125 A * | 7/1998 | Busse et al. | ..................... | 385/80 |
| 6,167,177 A * | 12/2000 | Sandstrom et al. | ........... | 385/100 |
| 6,226,424 B1 * | 5/2001 | Ball et al. | ......................... | 385/14 |
| 6,370,290 B1 * | 4/2002 | Ball et al. | ......................... | 385/14 |
| 7,023,532 B2 * | 4/2006 | Bengtsson et al. | ........... | 356/73.1 |
| 7,369,582 B2 * | 5/2008 | Kumkar et al. | .................. | 372/6 |
| 7,587,110 B2 * | 9/2009 | Singh et al. | .................. | 385/126 |

FOREIGN PATENT DOCUMENTS

| GB | 2183360 A | 6/1987 |
|---|---|---|
| SE | 509706 C2 | 3/1999 |

OTHER PUBLICATIONS

International Search Report, dated Sep. 12, 2008, issued in counterpart International Application No. PCT/SE2008/000386.
Written Opinion of the International Searching Authority, dated Sep. 12, 2008, issued in counterpart International Application No. PCT/SE2008/000386.

* cited by examiner

*Primary Examiner* — Loha Ben
(74) *Attorney, Agent, or Firm* — Venable LLP; Eric J. Franklin

(57) ABSTRACT

A device for cooling optical components based on optical fibers for transmitting high optical power. The device includes one or more cavities with a flowing coolant to take care of optical power loss. The device includes a transmitting construction material having a low heat expansion coefficient arranged in direct connection with the optical components and arranged to transmit power loss radiation into the cavity which is flushed with the flowing coolant. The transmitting construction material is made as a transparent tube and surrounded by a tubular casing of a non-transparent material having a good absorption capacity so that the cavity is formed between the two materials.

21 Claims, 3 Drawing Sheets

OPTICAL SYSTEM

CROSS-REFERENCE TO RELATED APPLICATIONS

This application claims priority to Swedish patent application 0701437-6 filed 13 Jun. 2007 and is the national phase under 35 U.S.C. §371 of PCT/SE2008/000386 filed 11 Jun. 2008.

FIELD OF THE INVENTION

The present invention relates to a device for cooling optical components based on optical fibers for transmitting high optical power, specifically power exceeding 100W. The system comprises one or more cavities with a flowing coolant to take care of such optical power loss.

BACKGROUND OF THE INVENTION

Optical fiber cables for transmitting high optical power are frequently used in industrial applications. Specifically they are used in cutting and welding operations by means of high-power laser radiation, but also in other industrial applications such as heating, detection or working operations in high temperature environments this type of high power optical fiber cables can be used.

Due to the all increasing laser power which is used today—together with an all increasing radiation quality—the requirements on the optical components in the system to really sustain the high power have also been increased. The optical components must provide a high stability with respect to focal lengths, focusing quality etc. For that reason, it is often necessary to cool down the optical components in order to maintain the necessary stability. The present invention relates to a device for providing a more efficient cooling capacity compared to previous designs.

The main reason for instabilities in the optical system is the heating. Heating is not only effecting the optical components as such but also the housing in which the optical components are mounted. In this case the heating from the housing is transmitted by radiation and convection to the optical components so that they are also heated. One reason to the heating is the uncontrolled radiation existing around the radiation beam itself and which might hit a mechanical detail such as the optical lens holder so that this mechanical component is heated. Another reason is the heating generated due to radiation impinging upon the lens itself and which is reflected back due to imperfections on the anti-reflex treated lens surface or due to particles on the lens surface. Such back-reflected, uncontrolled radiation might also generate a heating effect on the housing. If the housing is heated, as a secondary effect, also the optical components might be heated by radiation or convection. In addition to these processes there is also a certain absorption in the lens material.

The traditional technique to take care of such unwanted heating effect is to cool down the holder itself in which the optical components are mounted. A holder, preferably made of a material having a good heat conducting capacity, such as aluminum, is used for the housing of the optical components. Outside this housing it is arranged a cooling device filled with a flowing coolant, preferably water. The cooling device is made of a material which should not be effected by the coolant, for instance acid-proof stainless steel. In order to minimize the heating resistance between the cooling device and the housing the wall of the housing is made thin and a glue with a good heat conducting capacity is used for the mounting.

As an alternative, the cooling device might be arranged in a direct contact with the housing so that the coolant is flowing in canals directly on the housing. Also in this case the housing is made of a material with a good heat conducting capacity. The advantage with this method is a more efficient cooling effect, but as the coolant is in direct contact with the heat conducting material, usually aluminum, this design might cause corrosion problems, if not specific corrosion inhibitors are added to the flowing coolant.

In order to avoid high temperature gradients in the system, preferably a material with a good heat conducting capacity, such as aluminum, should be used. However, such materials normally also have a high heat expansion coefficient with inherent mechanical deformations which might easily cause optical instabilities.

As to cooling an optical fiber, it is previously known by SE 509 706 to have at least one of the contact ends of the fiber located in a cavity filled with a flowing coolant so that radiation falling outside the fiber is entered into and absorbed at least partially by the coolant. For optical components mounted in some type of housing or holder this type of direct cooling cannot be used.

SUMMARY OF THE INVENTION

The object of the present invention is to provide a more efficient cooling of optical components in order to reach the optical stability which is required for transmitting very high optical power. According to the invention, it is combined a method for minimizing the heating with a method for providing a high mechanical stability even in case of an increased temperature.

The invention is characterised by a transmitting construction material having a low heat expansion coefficient arranged in direct connection with the optical components and arranged to transmit power loss radiation into a cavity with a flowing external coolant.

According to a preferred embodiment of the invention, the transmitting construction material is made as a transparent tube, preferably made of a quartz material, which tube is surrounded by a non-transparent material, prefeably metal, so that said cavity is formed between these two materials.

According to the invention, the radiation is substantially absorbed in the rear wall which is made for a good absorbtion. As this wall is in direct contact with the coolant an efficient cooling is provided. The radiation might also be absorbed in the coolant.

According to a further preferred embodiment, the optical components are mounted directly on the transmitting construction material. As the transmitting material has a low heat expansion coefficient the heat expansion should be minimal and a mechanical stable construction is provided even in case of a temperature change.

In the following, the invention will be described more in detail in connection with the accompanying drawings in which it is schematically illustrated some examples of the invention.

DETAILED DESCRIPTION OF EMBODIMENTS OF THE INVENTION

Figure 1:
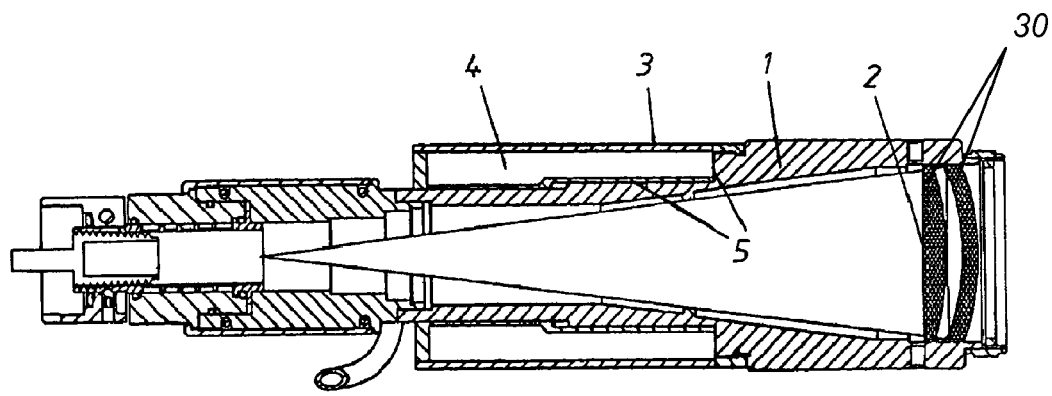
FIG. 1 shows an example of a prior art technique in which the cooling of the optics is effectuated by means of a separate cooling device.

In FIG. 1, it is illustrated an example of a traditional technique, which is used today, for cooling optical components based on fiber optical high power transmission. A holder 1, preferably made of a material having a good heat conductive capacity, for instance aluminum, is used as a housing for the optical components 2, in this case in the form of a lens system 30.

A cooling device 3 with a flowing coolant, preferably water 4, has been attached to said housing. The cooling device is made of a material which is resistant to the coolant, for instance acid-proof stainless steel. In order to minimize the heat conducting resistance between the cooling device and the housing, the wall of the cooling device is thin and is attached to the housing by means of a glue or the like 5 with a good heat conducting capacity. According to this technique, it is the holder itself, on which the optical components are mounted, which is cooled down.

Figure 2:
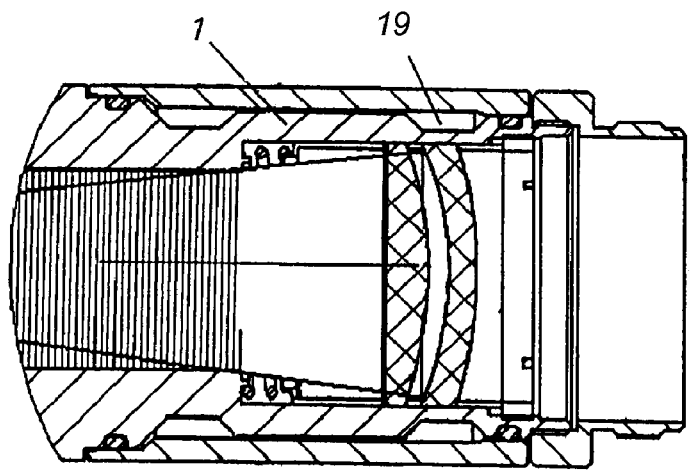
FIG. 2 shows an example of a prior art technique in which the cooling of the optics is effectuated by means of an integrated cooling device.

In FIG. 2, it is illustrated another example of a traditional technique, which is also used today, for cooling optical components. In this case the cooling device is arranged in a direct connection with the holder 1 in which the optical components are mounted so that the coolant is flowing in specific cooling canals 19 direct on the housing. Similar to the first example the holder 1 is made of a heat conductive material. The advantage with this embodiment is a more efficient cooling effect. However, as the coolant is in a direct contact with the heat conductive material of the housing, usually aluminum, specific corrosion inhibitors must be added to the coolant in order to avoid corrosion problems.

Figure 3:
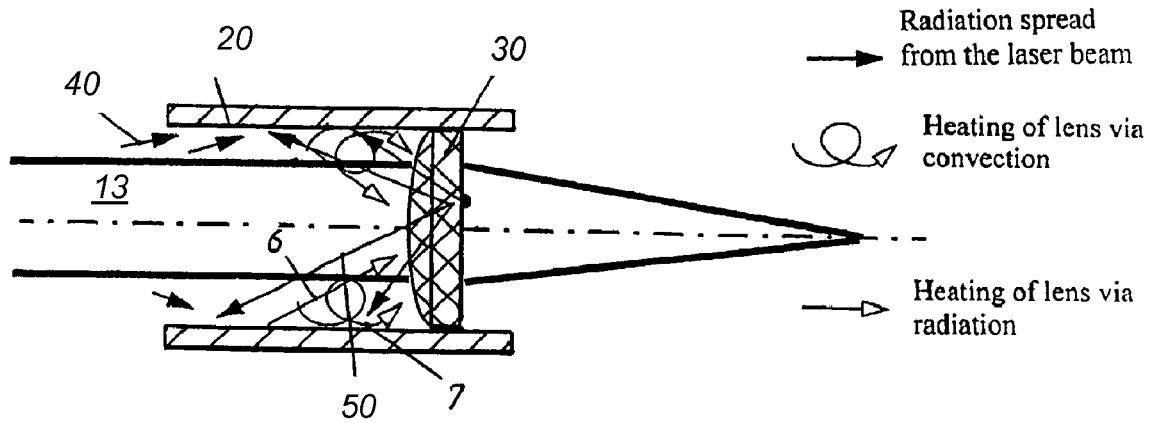
FIG. 3 shows different heating factors by which the optical components in an optical system are influenced.

FIG. 3 illustrates different heating factors by which the optical components in an optical system are influenced. The main reason for an instability in an optical system is the heating effects—heating of the optical components as such or heating of the housing in which the optical components are mounted. A heating of the housing might also indirectly cause a heating of the optical components by radiation and convection. Some reasons for the heating are illustrated in the figure. A radiation beam 13 is entered into a lens holder 20 in which a lens system 30 is mounted. Around the radiation beam 13 there is a certain amount of stray radiation 40 which impinges upon the lens holder so that the holder is heated. So this stray radiation is one of the reasons for the heating effect. Another reason is the heating which is generated due to the fact that some part 50 of the radiation might be reflected back due to imperfections on the anti-reflex treated lens surface or due to particles on the lens surface when the radiation beam 13 is impinging upon the lens system 30 itself, as illustrated by the arrows in the figure. Such uncontrolled radiation might also generate a heating effect on the housing. If the housing is heated, as a secondary effect, also the optical components might be heated by radiation or convection, as indicated by the arrows 6 and 7 in the figure. In addition to these processes there is also a certain absorption in the lens material.

Figure 4:
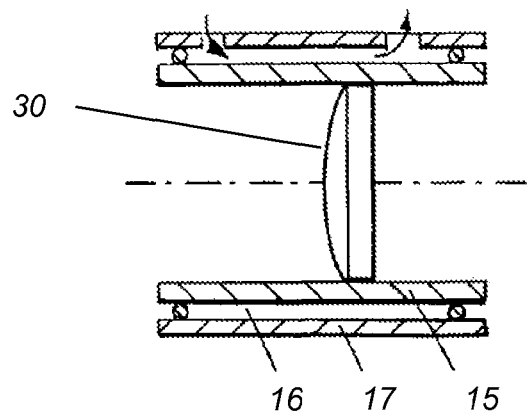
FIG. 4 shows the general idea of the invention.
Figure 5:
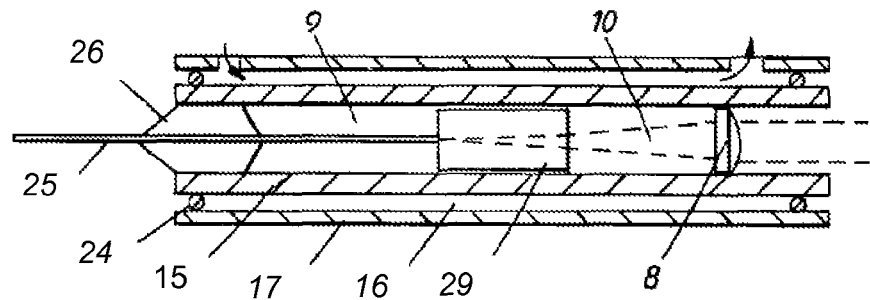
FIG. 5 shows a first embodiment of the invention in the form of a fiber contact having an integrated collimating optics.
Figure 6:
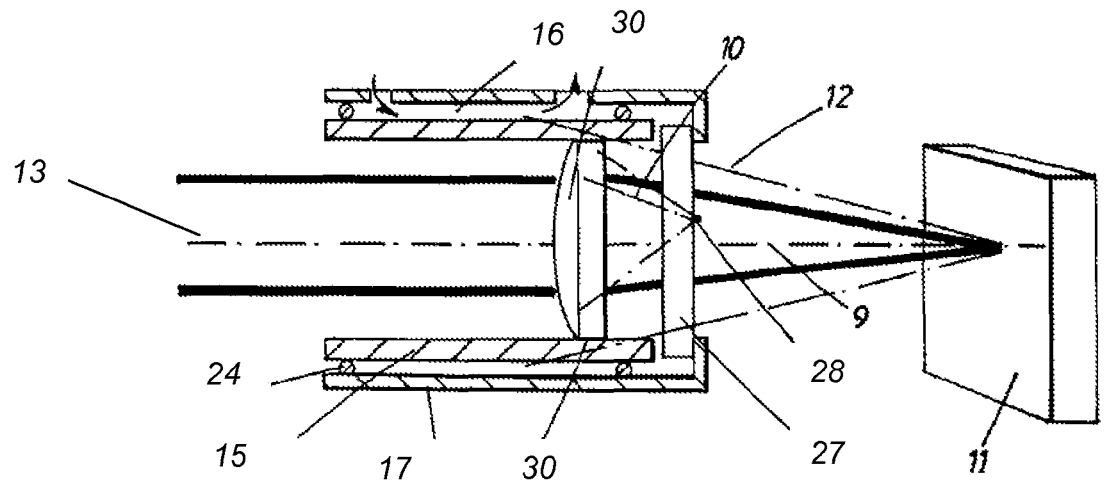
FIG. 6 shows an other embodiment of the invention in the form of an focusing optics for optical high power.
Figure 7:
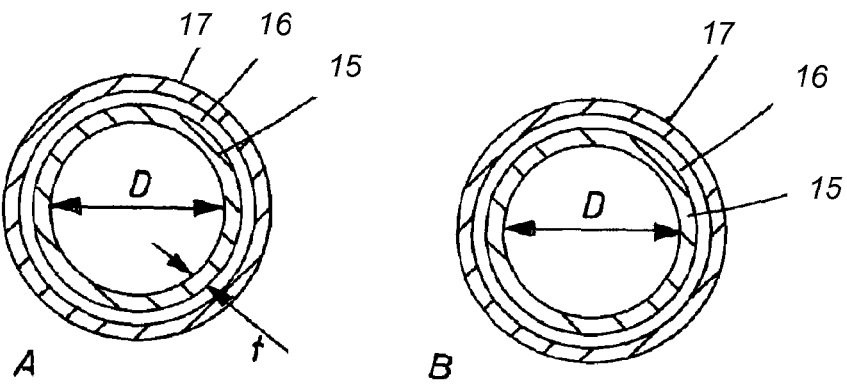
FIG. 7 shows schematically two geometrical FIGS. A and B for a comparative, mathematical calculation of the difference in cooling effect by using a transmitting material next to the optical components compared to a traditional holder made of a heat conductive material.

In FIG. 4, the basic idea of the invention is illustrated by means of a lens system 30 mounted in a tubular holder 15. When a radiation beam (not illustrated here) goes into the lens holder there is always a certain amount of stray radiation or spread radiation. Such uncontrolled radiation might cause a heating of the housing as already discussed. According to the basic idea of the present invention as illustrated in FIGS. 5-7 a transmitting construction material is provided next to the high power radiation so that the uncontrolled radiation is transmitted into a cavity or volume 16 with an external coolant, basically in the form of a fluid or a gas, preferably water. The power loss radiation is substantially absorbed in the outer wall 17, made for good absorption capacity. The outer wall 17 may be tubular as illustrated in FIG. 7. As this wall is in a direct contact with the coolant an efficient cooling is provided. The radiation might also be absorbed, at least partially, in the coolant. Tightenings in the form of sealing O-rings 24 are disposed between the tubes 15 and 17 of two construction materials in order to enclose the volume 16.

In order to provide a mechanically stable construction, also in case of a change of the temperature, the optical components should be mounted directly to the transparent material which is designed to have a heat expansion as low as possible. The lens system 30 in FIG. 4 is attached to the tube 15 of transmitting construction material by means of a glue or the like having non-absorbing properties.

The material should be selected so that the lens system 5 and the surrounding tube 1 has the same thermal properties. If there is a certain absorption in the optical system, and this absorption is the main heating source, then the tube might have a somewhat higher heat expansion coefficient. Some examples of suitable construction materials and their heat expansion coefficients for the surrounding tube should be quartz, having a heat expansion coefficient of 4.4 (ppm/K), sapphire with a heat expansion coefficient of 5.8 (ppm/K) or aluminium oxide ceramics (99.5%) having a heat expansion coefficient of 8.3 (ppm/K). The transmitting construction material can have a heat expansion coefficient that is less than 10 ppm/K.

As the inner wall according to the invention has the same temperature as the coolant, the optical components are not heated either by heat radiation or convection.

In FIG. 5, it is illustrated a first embodiment of the invention in the form of a fiber contact device with an integrated collimating optics. The contact device comprises a transparent tube 15, preferably made of a quartz material, which is surrounded by a tube 17 of non-transparent material, preferably a metal. Between these two components tightenings in the form of sealing O-rings 24 are disposed so that the enclosed volume 16 can be flushed by means of a coolant, preferably water. An optical fiber 25 is attached directly or indirectly by means of a body 26 to the transparent tube 15. The end portion of the fiber is provided with a rod 29, for instance similar to Swedish Patent No. 505884. This rod is also attached to the transparent tube 15. Also the collimating optics 8 for the radiation beam from the fiber is attched to the transparent tube. Radiation which is falling outside the volumes 9 and 10 for some reason is transmitted through the transparent tube 15 and is absorbed on the non-transparent tube 17. The surface which is absorbing radiation is in a direct contact with the coolant, so that a very efficient cooling effect is attained.

To sum up, the following advantages are provided by the present design:

An efficient cooling of power loss radiation.

A minimum of deformations as all the components are mounted in the transparent tube which has a low thermal expansion coefficient.

As the optical fiber is made of quartz, quartz is also preferred for the transparent tube. In case of a heating of the component the tube and the fiber has the same thermal expansion, meaning no or a minimum of strain forces on the fiber.

As the temperature of the quartz tube is adopted to the temperature of the coolant water, the optics is not heated either by thermal radiation or convection.

In FIG. 6, it is illustrated a second embodiment of the invention by means of an optical focusing device for high optical power. According to the invention the optical focusing device comprises a transparent tube 15, preferably made of a quartz material, which is surrounded by a tube 17 of non-transparent material, preferably a metal. Between these two components tightenings in the form of for instance sealing O-rings 24 are disposed so that the enclosed volume 16 can be flushed by a coolant, preferably water. The lens elements 30 are attached to the transparent tube by means of a non-absorbing material, preferably a UV-hardening optical glue or an optical epoxy. In order to protect the optical components a protecting glass 27 is arranged on the device. As the protecting glass is exposed to the environment, sooner or later dirty particles 28 are collected on the glass surface. Some of the radiation from the main beam 13 is spread by the particles. Such radiation is heating the holder of the optics. In the same way, radiation spread from the working piece 11 hits the optical lens holder, which has been indicated by the line 12 in the figure. According to the invention these types of spread radiation are absorbed in the parts 15 and 17 of the lens holder and there is no heating of the optics.

As already mentioned the lens elements 30 are attached to the transparent tube by means of a non-absorbing, optical glue or the like. As an alternative the lens might be fastened by means of distance elements or the like, preferably made of a transparent material. The distance elements are either glued or squeezed together with some outer member. Preferably, one of the distance elements is made somewhat elastic in order to avoid uncontrolled pressure on the lens. The mounting of the lens system is made in the same way, either it is glued directly on to the cylindric surface, or as an alternative, fastened by means of distance elements, or a combination of these methods.

The following advantages are provided by a design according to FIG. 6:

An efficient cooling of power loss radiation.

A minimum of deterioration of the optical characteristics due to thermal influence as all the parts in the device which are in contact with the optics does not absorb any radiation.

If the optical components which are used in the device are made of quartz, quartz is also preferred for the transparent tube. In case of a heating of the component the tube and the optics has the same thermal expansion, meaning no or a minimum of strain forces on the optics.

As the temperature of the quartz tube is adopted to the temperature of the coolant water, the optics is not heated either by thermal radiation or convection.

By means of a mathematical calculation it is possible to determine the difference in cooling effect by introducing a transmitting material next to the optical components according to the invention, compared to a traditional holder made of a heat conductive material. In FIG. 7 it is illustrated two different geometrical FIGS. A and B for such a comparative calculation. In the first geometrical FIG. A the inner part 15 is made of a metallic material which is absorbing stray radiation. The material is supposed to have a thickness t. Outside this material there is a coolant in a volume 16 enclosed by an outer metal casing 17. In the second geometrical FIG. B the inner part 15 comprises a transparent tube, which is transmitting radiation into the volume 16 filled with the flowing coolant. The outer casing 17 is absorbing radiation which is cooled down directly by the coolant. The coolant is supposed to be transparent.

Figure 8:
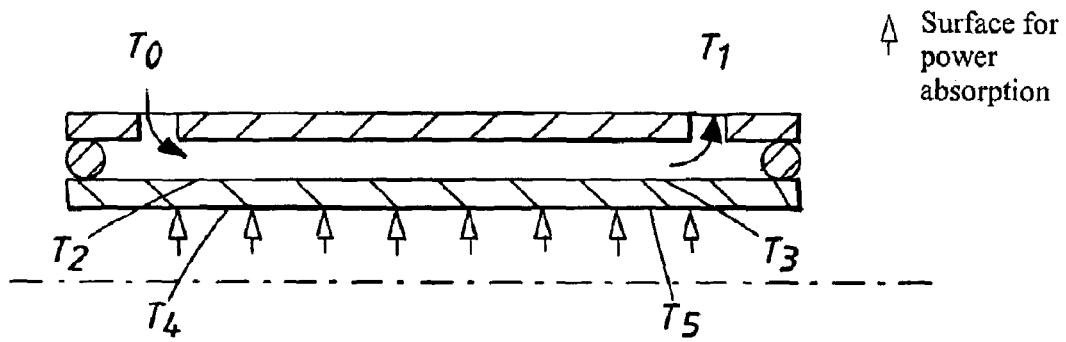
FIG. 8 shows the temperature distribution for the first geometrical figure, version A, i e traditional cooling.
Figure 9:
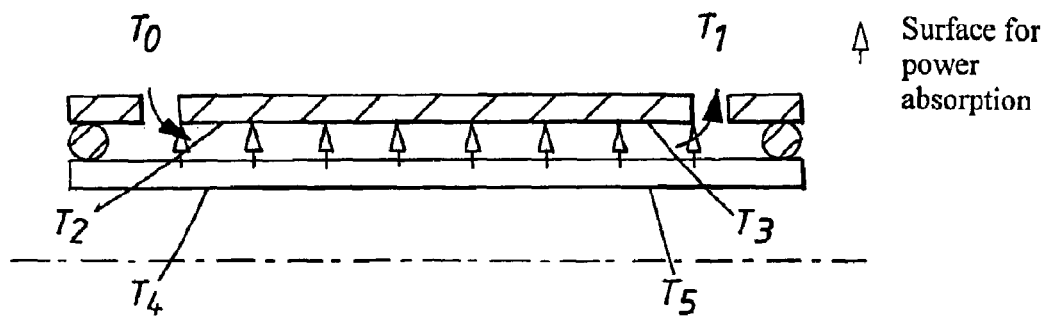
FIG. 9 shows the temperature distribution for the second geometrical figure, version B, i e cooling according to the invention.

In FIGS. 8 and 9, it is illustrated the temperature distribution for the two geometrical figures, in which the following temperature indications have ben used for different positions:

$T_0$ The average temperature of the coolant water at the inlet opening.

$T_1$ The average temperature of the coolant water at the outlet opening.

$T_2$ The temperature on the outer diameter of the inner tube (version A) and the inner diameter of the outer tube (version B), respectively, at the inlet opening for the coolant.

$T_3$ The temperature on the outer diameter of the inner tube (version A) and the inner diameter of the outer tube (version B), repectively, at the outlet opening for the coolant.

$T_4$ The temperature on the inner diameter of the inner tube at the inlet opening for the coolant.

$T_5$ The temperature on the inner diameter of the inner tube at the outlet opening of the coolant.

In version B, power loss radiation is transmitted through the coolant and absorbed by the metallic surface. It is supposed that no optical power is absorbed in the coolant and all the power loss radiation is cooled down by the coolant. In case of a certain absorption in the coolant the temperatures $T_2$ and $T_3$ in version B will be lower.

If the following input data (same for both versions) is used for the calculation Power loss: 500W Optical diameter: 25 mm Length: 50 mm Coolant: water Thickness of the coolant canal: 1 mm Inlet water temperature: 20° C.

Wall thickness (version A): 3 mm

Wall material (version A): stainless steel

Coolant water temperature (To): 20° C.

Coolant flowing rate: 1 liter/minute then the following temperature differences are obtained $$\Delta T_{water} = 7° C.$$

$$\Delta T_{wall} = 22° C.$$

$$\Delta T_r = 20° C.$$

where $\Delta T_{water}$ is the difference between the temperature of the coolant water at the inlet opening and the outlet opening, $\Delta T_{wall}$ is the difference between the temperature of the inner wall and the average temperature of the water, and $\Delta T_r$ is the temperature difference between the outer and inner diameter of the inner tube.

By means of a mathematical calculation, the following temperature distribution is obtained for the different positions in the two versions:

|  | Version A | Version B |
|---|---|---|
| $T_0$ | 20° C. | 20° C. |
| $T_1$ | 27° C. | 27° C. |
| $T_2$ | 42° C. | 42° C. |
| $T_3$ | 49° C. | 49° C. |
| $T_4$ | 62° C. | 20° C. |
| $T_5$ | 69° C. | 27° C. |

It is clear that in version B the temperatures $T_4$ and $T_5$ are maintained at 20° C. and 27° C., respectively, i.e. no heating, while in version A with a metallic, heat absorbing, inner casing a heating up to 62° C. and 69° C., respectively, has been obtained. Consequently, it is confirmed by these mathematical calculations that a more efficient cooling is obtained by means of version B according to the invention.

The invention is not limited to the examples which has been described above but can be varied within the scope of the following claims. Accordingly, it should be understood that the invention could be used for other types of optical components then those illustrated in the FIGS. 5 and 6. The reference numerals in the claims are referring to FIGS. 4-6.

The invention claimed is:

1. A device for cooling optical components based on optical fibers for transmitting high optical power, the device comprising:
   at least one cavity configured to receive a flowing coolant, wherein the device comprises a transmitting construction material having a low heat expansion coefficient arranged in direct connection with the optical components and arranged to transmit power loss radiation into the at least one cavity and thereby to the flowing coolant.

2. The device according to claim 1, wherein the transmitting construction material is surrounded by a non-transparent material having a good absorption capacity, so that said cavity is formed between the transmitting construction material and the non-transparent material.

3. The device according to claim 2, wherein the outer, non-transparent material is tubular, so that said cavity for the coolant is formed between the two tubular construction materials.

4. The device according to claim 3, further comprising:
   tightenings comprising O-rings disposed between the two tubular construction materials to enclose said at least one cavity which is flushed by the coolant.

5. The device according to claim 2, wherein the non-transparent material comprises metal.

6. The device according to claim 1, wherein the transmitting construction material is made as a transparent tube.

7. The device according to claim 6, wherein the transmitting construction material has a heat expansion coefficient which is less than 10 ppm/K.

8. The device according to claim 7, wherein the transmitting construction material comprises a material having substantially the same thermal properties as the optical components.

9. The device according to claim 7, wherein the transmitting construction material comprises quartz.

10. The device according to claim 7, wherein the transmitting construction material comprises sapphire.

11. The device according to claim 7, wherein the transmitting construction material comprises aluminum oxide ceramics.

12. The device according to claim 1, wherein the optical components are mounted directly on the transmitting construction material utilizing a non-absorbing material.

13. The device according to claim 12, wherein the optical components are mounted directly on the transmitting construction material utilizing UV-hardening optical glue or epoxy.

14. The device according to claim 12, wherein the optical components are mounted directly on the transmitting construction material utilizing transparent distance elements fastened by glue or clamping directly on the transmitting construction material.

15. The device according to claim 1, wherein the flowing coolant is an external fluid.

16. The device according to claim 15, wherein the flowing coolant is water.

17. The device according to claim 1, wherein the flowing coolant is an external, transparent gas.

18. The device according to claim 1, further comprising:
    an optical fiber contact comprising an optical fiber with collimating optics, wherein both the optical fiber and the collimating optics are attached to the transmitting construction material.

19. The device according to claim 1, further comprising:
    focusing optics for high optical power comprising a lens system for focusing a high power optical radiation beam on a workpiece, wherein the lens system is attached to the transmitting construction material.

20. The device according to claim 19, wherein the lens system is attached directly to a cylindrical surface of the transmitting construction material utilizing at least one of a glue and distance elements.

21. The device according to claim 1, wherein the optical fibers are for transmitting optical power exceeding 100W.

* * * * *